April 13, 1926.

W. L. GAINES

DYNAMOMETER

Filed April 14, 1924    2 Sheets-Sheet 1

1,580,430

Inventor
Walter L. Gaines,
By Cheever & Cox
Attorneys

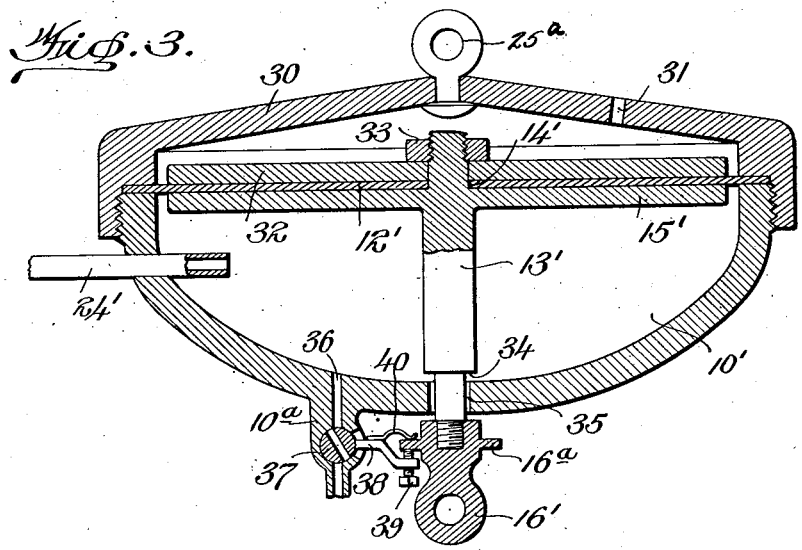
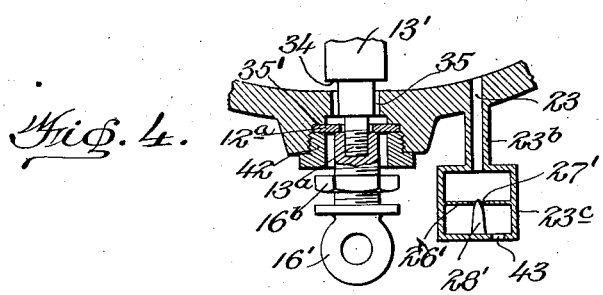
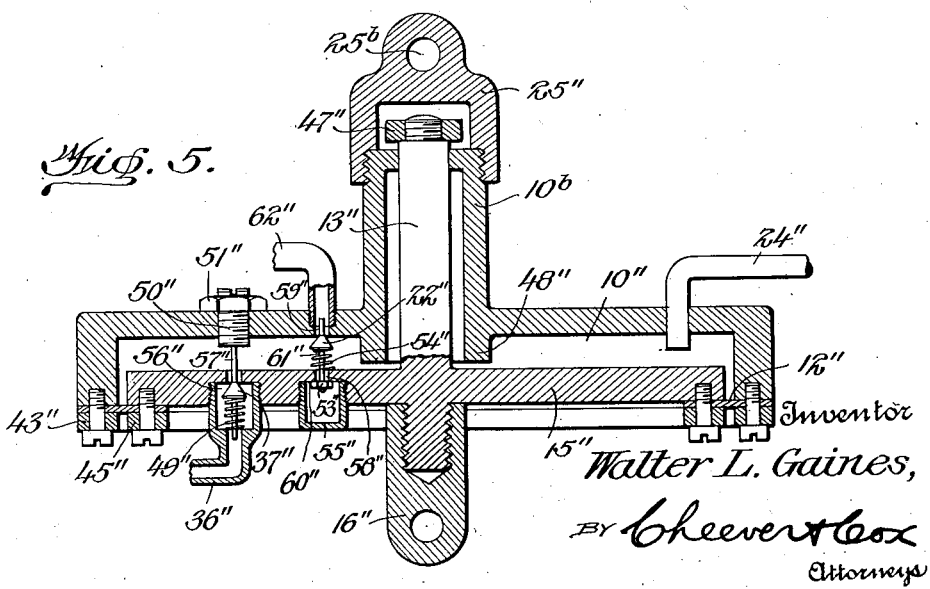

Patented Apr. 13, 1926.

1,580,430

UNITED STATES PATENT OFFICE.

WALTER L. GAINES, OF URBANA, ILLINOIS.

DYNAMOMETER.

Application filed April 14, 1924. Serial No. 706,377.

*To all whom it may concern:*

Be it known that I, WALTER L. GAINES, a citizen of the United States, residing at Urbana, in the county of Champaign and State of Illinois, have invented a certain new and useful Improvement in Dynamometers, of which the following is a specification.

My invention relates to a dynamometer and particularly to a dynamometer of the transmission type. It is my purpose to provide a device of this type which will be simple in construction, accurate in operation, adaptable in use, and in which the working movements of the parts have an unusually small value.

In my invention the force to be measured and transmitted is counter-balanced by gas pressures controlled by, but not created by, the force to be measured. I employ two divergent gas pressures through the medium of a chamber closed substantially gas-tight except as to the control openings, and provided with a flexible diaphragm of definite cross-sectional effective area upon the opposite surfaces of which the divergent gas pressures act to counterbalance the force to be measured. In this instance the gas pressure employed to act upon the outer surface of the diaphragm is the natural atmospheric pressure of the moment, while that to act on the inner surface is supplied from an artificial source of decreased or increased pressure, the artificial pressure being created by means entirely independent of the force to be measured. The difference in pressure on the two sides of the diaphragm counter-balances the force to be measured and affords an index of its value. I employ standard apparatus to create the supply of artificial pressure and to measure or record the difference in pressure, which sort of apparatus is so common and well known as to require no description in this connection.

I will disclose my invention in the best forms known to me at present, but it will be understood that such disclosure is merely illustrative and is susceptible to changes in forms and proportions and to desirable additions with the exercise of only ordinary mechanical skill and without departing from the scope thereof as set forth in the appended claims.

In describing my invention reference will be had to the accompanying drawings wherein—

Figure 1:
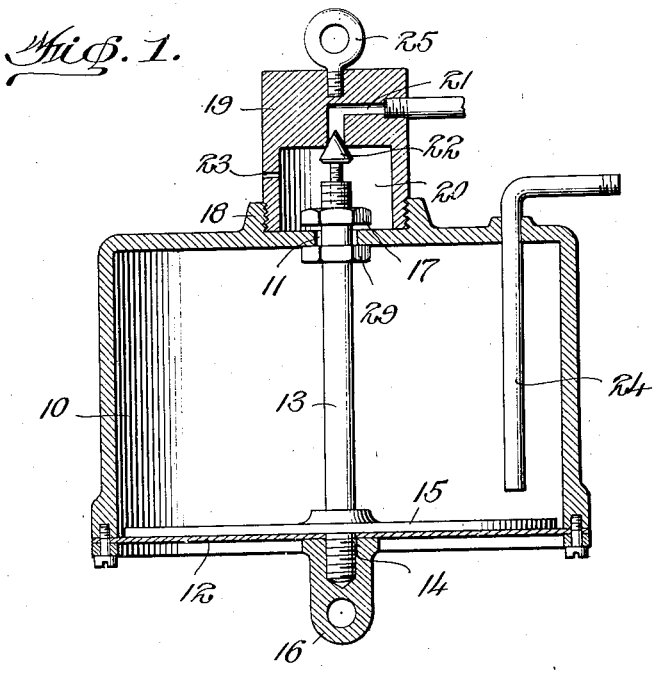

Figure 1 is a vertical section of a dynamometer constructed in accordance with my invention and wherein a reduction of gas pressure within a substantially closed chamber is utilized in measuring a desired force.

Figure 2:
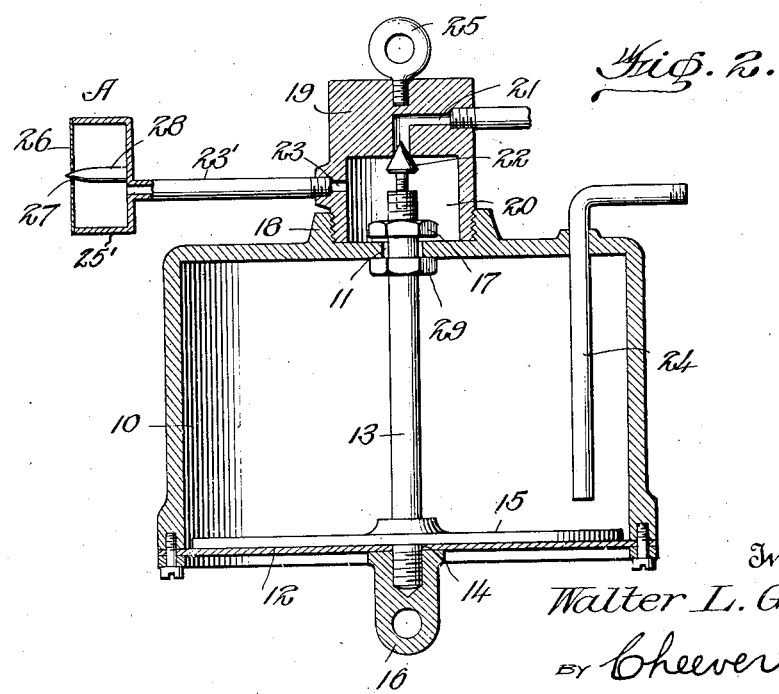

Figure 2, a similar view showing a modified form of the invention as disclosed in Figure 1;

Figure 3, a vertical section of a dynamometer constructed in accordance with my invention and wherein an increase of gas pressure within a substantially closed chamber is utilized in measuring a desired force;

Figure 4, a fragmentary section showing a modified form of the invention as disclosed in Figure 3; and Figure 5, a vertical section showing another modified form of my invention wherein either a reduction or increase of fluid pressure within a chamber closed substantially gas tight, except as to control openings, is utilized in measuring a desired force.

With reference to the drawings and particularly Figure 1, my invention is shown as comprising a hollow cylindrical body portion 10 having an axial opening 11 in one end and its other end closed by a flexible diaphragm 12. A rod 13 disposed axially of the body portion passes freely through the opening 11 and through an opening 14 in diaphragm 12. A circumscribing flange 15 on the rod 13 coacts with the inner face of the diaphragm and a boss 16 threaded on the adjacent end of the rod 13 operates to clamp the central portion of the diaphragm 12 against the flange as will be apparent. Threaded on the opposite end of the rod 13 on either side of the opening 11 are two nuts 17 and 29 which are adapted to limit the movement of the diaphragm relative to the body 10. Surrounding the opening 11 and carried by the body 10 is an exteriorly projecting annular flange 18 within which is threaded a gas tight boss 19 having a chamber 20 in which the adjacent end of the rod 13 is housed. Formed in the boss 19 is an exhaust passage 21 which communicates at one end with the chamber 20, while its other end is adapted for connection with a source of decreased gas pressure. The exhausting of gas through the passage 21 is controlled by a valve 22 carried by the rod 13 and this valve is in turn controlled by movement of diaphragm 12 as will be obvious. For a purpose that will presently appear I vent the chamber 20 to the atmosphere by a port 23. A tube 24 extends into the interior of the body 10 and has one end disposed adjacent the diaphragm 12, while the end thereof exterior of the body is adapted for connection to suitable vacuum gauge or gauges.

In operation the device is attached to a support or object of draft through the medium of an eye member 25, mounted centrally on the boss 19. The force to be measured is applied, through the medium of suitable connections, to the eye located centrally to the diaphragm 12 in the boss 16. With the passage 21 connected with a source of reduced pressure and the force acting through 16 in a direction away from eye 25, it is obvious that the valve 22 will be opened, the pressure in 20 and 10 reduced, and consequently there will develop a force acting on the diaphragm 12 opposed to the force acting at 16. At the same time, due to the reduced pressure in 20, atmospheric air enters the vent 23 into 20, past the valve 22 and out through 21. With a constant force acting at 16 the diaphragm 12 will come to rest when and only when (within the measuring capacity of the apparatus) the pressure acting on the inner surface of diaphragm 12 is sufficiently reduced so that the excess of the greater pressure (natural atmospheric pressure) acting on the outer surface of diaphragm 12 exactly counterbalances the force acting at 16. The diaphragm 12 being of fixed area it follows that the vacuum at its inner face will be proportional to the force acting at 16. The vacuum gauge or gauges connected to the tube 24 may be of any number, located at any point within reasonable distance of the dynamometer. Such gauges may also be of any type, either indicating or recording; the only requirement being a substantially gas-tight connection with the tube 24 and exposure to the same barometric pressure as exists at the dynamometer. By suitable gradation of such gauge, according to the effective area of diaphragm 12, direct reading in any unit of the force acting at 16 may be obtained. Thus the force acting at 16 is measured in absolute units and such measuring is either indicated or recorded according to the particular type of gauge employed.

While the movement of the diaphragm 12 and valve 22 is very small, it may be still further reduced to an extremely small value and thereby contribute to both the accuracy of the device and its field of usefulness. I attain this end by automatically controlling the venting of air from the atmosphere through the port 23 to the chamber 20. The structure resorted to by me for this purpose is illustrated in Figure 2 and comprises an auxiliary valve A in the form of a hollow member 25' having its interior in communication with the chamber 20 through a tube portion 23' and a port 23. The end of the member 25' remote from the port 23 is formed by a spring diaphragm 26 provided with a central opening 27 centered on a cone shaped needle 28 rigidly secured to the end of the member 25' opposite the diaphragm 26. With the auxiliary valve A thus incorporated, it will be observed in operation that air passes from the interior of the member 25' to chamber 20 and from chamber 20 through passage 21. The amount of air passing will be proportional to the area of the opening 27 and the square of the difference in pressure on either side of said opening. The object now is to hold the valve 22 at a constant position, with a variable force acting at the boss 16. As the force at 16 increases the pressure in the chamber 20 and interior of the body 10 approaches that in the passage 21 and the mass of air passing the valve 22 must be reduced. The reduction in pressure in chamber 20 and the interior of the body 10 accompanying increase in force at boss 16 is communicated to the interior of member 25' and as a result the diaphragm 26 is sprung inwardly and the opening 27 is partially closed by the needle 28; the shape and size of the needle 28 being adjusted to the opening 27 and the resistance of diaphragm 26 so as to admit just the mass of air that will pass valve 22 at constant position with variable pressure in chamber 20 and the interior of the body 10 due to variable force at the boss 16. Thus the working movement of the diaphragm 12 and valve 22 is reduced to an extremely small value.

While in the foregoing description of the structure and operation of my dynamometer it has been assumed as attached to the object of draft at 25 with the force to be measured acting at 16, it will be apparent that the same will function equally well by attaching the device to the object of draft at 16 and applying the force to be measured at 25.

In Figure 3 I have illustrated a form of my invention wherein I utilize an increased pressure within a substantially closed chamber, that is a gas pressure in excess of atmospheric pressure, to measure a desired force.

In this form of my invention 10' is a dished body having its open end closed by a cap 30, said cap having threaded connection with the body as will be apparent. A diaphragm 12' is clamped between the cap 30 and body 10' and an opening 31 in said cap 30 provides atmospheric pressure to the surface of the diaphragm adjacent the cap. A rod 13' disposed axially of the body 10' and cap 30 passes through a central opening 14' in the diaphragm 12' and is provided with a flange 15' which engages with the surface of the diaphragm, which is remote from the cap 30. A plate 32 engages the surface of the diaphragm 12' adjacent the cap 30, said plate having a central opening through which the rod 13' passes. A nut 33 threaded on rod 13' serves to clamp the diaphragm 12' between the plate 32 and flange 15' as will be obvious. The end of the rod 13' remote from the diaphragm is reduced to provide a shoulder 34 and the reduced portion passes somewhat loosely through an opening 35 in the body 10', said looseness of fit of the rod in opening 35 being sufficient to permit of limited gas escape from the interior of the body in the operation of the device and as will hereinafter appear. The portion of the reduced end of the rod 13' which projects exteriorly of the body 10' has threaded thereon an eye member 16' having a circumscribing flange 16ª, it being here noted that the shoulder 34 and member 16' are so positioned as to allow a small range of movement of diaphragm 12' relative to the body 10', such range permitting substantially equal movement of the diaphragm in either direction from its line of attachment to the body. An outward extension 10ª is provided on the body 10' substantially parallel to the rod 13' and member 16' and such extension is provided with a passage 36 opening at one end through the outer end of the extension and at its other end into the interior of the body 10'. This passage 36 is controlled by a rotatable valve 37 having an arm 38 extending which projects exteriorly of the extension 10ª and carries an adjusting screw 39 engageable against one side of the flange 16ª. A spring 40 attached to the arm 38 engages the other side of said flange 16ª whereby manipulation of the adjusting screw 39 will in turn adjust the valve 37 with respect to the passage 36. For correct operation of the device the valve 37 is adjusted so as to be just closed when the diaphragm has moved toward the cap 30 to the full extent permitted by the member 16'. A tube 24' leads from the interior of the body 10' from a point near the diaphragm to the exterior of said body and is adapted to be connected with suitable pressure gauge.

In the operation of this form of my invention the dynamometer is attached to a support or object of draft through an eye member 25ª carried by the cap 30, the tube 24' is connected with a suitable pressure gauge and the passage 36 with a source of gas pressure greater than atmospheric pressure; whereupon the diaphragm 12' is forced toward the cap 30 until the valve 37 is closed. The force to be measured is then applied at member 16', with the result that the diaphragm 12' is moved inwardly of the body and the valve 37 opened, so that gas enters through passage 36 until the pressure in body 10' is sufficient to balance the force at 16'. At the same time gas escapes from the body between the rod 13' and the wall of the opening 35. The diaphragm 12' then comes to rest at a point where the amount of air entering the body 10 through 36 is equal to the amount of air discharging therefrom. The gas pressure in the body 10 will then be proportional to the force acting at 16' and the pressure gauge connected with tube 24' will then measure the force.

In the form of my invention shown in Figure 3 it will be apparent that the escape of gas from the interior of the body between the wall of opening 35 and the reduced end of rod 13' cannot be controlled. However, in Figure 4, I show a form of construction designed to automatically control such gas escape. In this particular arrangement I counterbore the outer end of the passage 35 to provide a shoulder 35' and at the same time further reduce the adjacent end of rod 13' at 13ª. On this reduced end I thread the member 16' and between said member and shoulder 35' I further engage on said reduced end a diaphragm 12ª, the peripheral portion of which is clamped between the shoulder 35' and a nut 42 threaded in the counterbore which provides shoulder 35'. A nut 16ᵇ threaded on member 16' acts in conjunction with the shoulder 34 to limit possible movement of rod 13' as will be obvious.

An opening 23' in the body 10' communicates through a tube 23ᵇ with the interior of a casing 23ᶜ. Mounted transversely in this casing is a spring diaphragm 26' provided with a circular opening 27' at its center in which is entered and centered the point of a cone shaped needle 28' projecting inwardly from the outer end of the casing 23ᶜ, which outer end is provided with an opening 43 whereby the adjacent surface of the diaphragm 26' is exposed to atmospheric pressure. In this arrangement the escape of gas from the interior of the body 10' is by way of opening 23', tube 23ᵇ, opening 27' and opening 43. As the pressure in the body 10' increases, diaphragm 26' is sprung outward at its center and the opening 27' is forced along the increasing diameter of needle 28', thus reducing the effective area of opening 27'. The shape and size of the needle 28' are adjusted to the diameter of opening 27' and the resistance of diaphragm 26' to control the effective area of opening 27' in such manner that the amount of gas which can pass at varying values of pressure in 10' is the same, so far as may be, as that which can enter the body 10' through any particular connection thereof with a pressure supply. By the arrangement just described it will be apparent that the working movements of diaphragm 12ª and diaphragm 12' (Figure 3) are reduced. It will also be apparent that when the modification of Figure 4 is incorporated in the structure of Figure 3, the elements 12′ and 12ᵃ provide a differential diaphragm, the effective area of the former being reduced by the effective area of the latter.

In Figure 5 I have illustrated a form of my invention wherein either increase or decrease of gas pressure within a hollow body may be utilized in measuring a desired force; and wherein the force to be measured may act continuously in one direction, or continuously in the opposite direction, or alternately in one direction and in the opposite direction.

This form of my invention comprises a cylindrical hollow body 10″ having one end open and its other end provided with an outwardly directed axial tubular extension 10ᵇ and inwardly directed tubular extension 48″ coaxial with the extension 10ᵇ. The outer end of the extension 10ᵇ is closed by a cap 25″ having an aperture 25ᵇ therein whereby the device may be attached to a support or object of draft. Disposed through the extensions 10ᵇ and 48″ is a rod 13″ carrying a nut 47″ on one end engageable with the outer end of the extension 10ᵇ to limit longitudinal movement of the rod in one direction. This rod 13″ carries a circumscribing flange 15″ of an extent to dispose its peripheral edge in slight spacement from the inner face of the cylindrical wall of the body to which latter it is connected by a flexible ring 12″, the latter being secured to the body and flange by clamping rings 43″ and 45″ respectively. Thus it will be apparent that the flange 15″ and ring 12″ constitute a flexible diaphragm closing the open end of the body 10″ and whose movement inwardly of the body is limited by the extension 48″. An eye member 16″ is threaded on the end of rod 13″ adjacent the flange 15″ and constitutes one of the points of attachment of the dynamometer in use.

To connect the interior of the body 10″ with a source of compressed or increased gas pressure, I provide the flange 15″ with a passage 56″ controlled by a valve 37″ and adapted to seat on a shoulder formed in said passage. Threaded in the outer end of the passage 56″ is a pipe section 36″ having an interior shoulder from which a spring 49″ reacts to constantly urge the valve 37″ to its seat. Projecting from the valve 37″ through the passage 56″ and into the interior of the body 10″ is a stem 57″ and mounted in the end of the body opposite the stem 57″ is an adjustable plug 50″ secured by lock nut 51″ adapted to engage the stem under predetermined conditions to unseat the valve 37″ against the influence of spring 49″ to permit compressed gas to enter the interior of the body.

To connect the interior of the body with a source of decreased gas pressure, I provide the flange 15″ and the closed end of the body with alined passages 58″ and 59″ respectively. The passage 58″ is enlarged at its outer end to provide a shoulder 60″ and this passage is closed to the atmosphere by a cap 55″ threaded therein. The passage 58″ is controlled by a valve 22″ having a stem 61″ which projects into the passage 58″ and has secured thereon an adjusting nut 53″ engageable with shoulder 60″ and said valve 22″ is constantly urged to a position to close passage 59″ by a spring 54″ reacting from flange 15″. A pipe section 62″ has one end secured in passage 59″ and is adapted to be connected with a source of decreased gas pressure. Both the valves 37″ and 22″ are adjusted to be positioned just off their respective seats when the diaphragm formed by flange 15″ and ring 12″ is straight, that is, neither deflected inward or outward. A tube 24″ is provided to connect the interior of the body 10″ with a pressure or vacuum gauge or a combination pressure or vacuum gauge as may be required.

In operation, when a decreased gas pressure is utilized in body 10″, the dynamometer is attached at 25ᵇ to a support or object of draft, while pipe 62″ is connected to a source of decreased gas pressure, and pipe 24″ to a vacuum gauge. The force to be measured is applied at 16″ to pull the flange 15″ outwardly. As a result of this movement of the flange 15″ the valve 22″ will be opened and valve 37″ closed. The pressure in the body 10″ will be reduced until the force being measured is balanced and the vacuum as indicated by a gauge connected to pipe 24″ will give a measure of the force. If the force exceeds the measuring capacity of the particular dynamometer the excess strain is taken by the nut 47″ coming in contact with the outer end of extension 10ᵇ. If the force decreases the flange 15″ will be drawn inwardly until the valve 37″ is opened by contact of its stem with plug 50″ and air is admitted. With a constant force the diaphragm formed by flange 15″ and ring 12″ will adjust itself and come to rest where both valves 22″ and 37″ are slightly open, so that the same mass of gas is passing each.

In operation, when gas pressure within the body 10″ greater than atmospheric is utilized, the dynamometer is supported, and the force to be measured applied at 16″ in a direction to move the flange 15″ inwardly. This movement of flange 15″ continues and operates the valve 22″ toward closed position and valve 37″ away from closed position until the pressure in 10″ equals the force acting at 16″. If the force decreases or for any reason an excess pressure develops in body 10″, the diaphragm (flange 15″ and ring 12″) will be forced outwardly until the valve 22″ opens and relieves the pressure. The diaphragm comes to rest with both valves 22″ and 37″ slightly open and the pressure as indicated by a gauge connected through pipe 24″ measures the force. The shoulder 48″ takes the strain of a force in excess of the measuring capacity of the device.

Where the force acting at 16″ is alternately inward and outward of the body 10″, the device is connected to both sources of increased and decreased pressures through pipes 36″ and 62″ respectively, while the pipe 24 is connected to a combination pressure and vacuum gauge. So connected up the action will be apparent from the previous description of operation. The diaphragm comes to rest with valves 22″ and 37″ slightly open and with passage of gas by valve 37″ into body 10″ and out by valve 22″. A vacuum in the body 10″ indicates a force acting to pull 25$^b$ and 16″ apart and measures its value; while pressure within the body indicates a force acting to push 25$^b$ and 16″ together and measures its value.

I claim:—

1. In a dynamometer, a hollow body having means for connecting the interior thereof with a source of gas pressure varying with respect to the pressure of the atmosphere, a diaphragm included in said body operable by variation between said pressures to balance an applied force to be measured, and means operated by the movement of the diaphragm to control the passage of gas between the interior of the body and the source.

2. In a dynamometer, a hollow body having means for connecting the interior thereof with a source of gas pressure varying with respect to normal pressure of the atmosphere, a diaphragm included in said body operable by variation between said pressures to balance an applied force to be measured, a valve for controlling the passage of gas between the body and source, and operative connections between said diaphragm and valve.

3. In a dynamometer, a hollow body having its interior in communication with the atmosphere and further having means for connecting its interior with a source of gas pressure varying with respect to the pressure of the atmosphere, means operable by variation between the pressure in the body and that of the atmosphere to control passage of gas between the interior of the body and source, and means operable by the same variation in pressures to control passage of gas between the interior of the body and the atmosphere.

4. In a dynamometer, a hollow body having means for connecting the interior thereof with a source of gas pressure varying with respect to the normal pressure of the atmosphere, a movable mechanism carried by the body operable by variation between the pressure in the body and that of the atmosphere to control passage of gas between the body and source, and upon which mechanism a force to be measured is adapted to act, and means for maintaining the position of said mechanism constant with a variable force acting thereon.

In witness whereof, I have hereunto subscribed my name.

WALTER L. GAINES.